United States Patent [19]

Kasevich et al.

[11] Patent Number: 5,199,488
[45] Date of Patent: * Apr. 6, 1993

[54] ELECTROMAGNETIC METHOD AND APPARATUS FOR THE TREATMENT OF RADIOACTIVE MATERIAL-CONTAINING VOLUMES

[75] Inventors: Raymond S. Kasevich, Weston; Raymond E. Holmes, Groton, both of Mass.

[73] Assignee: KAI Technologies, Inc., Woburn, Mass.

[*] Notice: The portion of the term of this patent subsequent to Nov. 19, 2008 has been disclaimed.

[21] Appl. No.: 745,950

[22] Filed: Aug. 16, 1991

Related U.S. Application Data

[63] Continuation-in-part of Ser. No. 491,005, Mar. 9, 1990, Pat. No. 5,065,819.

[51] Int. Cl.$^5$ .................. E21B 36/04; E21B 43/24
[52] U.S. Cl. ........................... 166/248; 405/128
[58] Field of Search ............ 166/245, 248, 60; 217/10.55 R, 10.65, 10.81; 405/128

[56] References Cited

U.S. PATENT DOCUMENTS

| | | | |
|---|---|---|---|
| 4,398,597 | 8/1983 | Itaberman | 166/248 X |
| 4,553,592 | 11/1985 | Looney et al. | 166/248 |
| 4,638,862 | 1/1987 | Savage | 166/248 |
| 4,705,108 | 11/1987 | Little et al. | 166/248 |

*Primary Examiner*—William P. Neuder
*Attorney, Agent, or Firm*—Hale and Dorr

[57] ABSTRACT

Methods and apparatus for treating containers holding mixed wastes and regions of the earth contaminated with radioactive materials or mixed waste provide for extracting one of non-radioactive or radioactive materials from the contaminated volume. The method also includes using a phase-modulated multiple antenna system for treating larger near-surface volumes and for creating steerable and variable heating patterns. The radio frequency antenna apparatus can be used for volatilizing non-radioactive materials from containers or volumes of the earth and disposing of them in a safe and controlled manner.

13 Claims, 7 Drawing Sheets

ELECTROMAGNETIC METHOD AND APPARATUS FOR THE TREATMENT OF RADIOACTIVE MATERIAL-CONTAINING VOLUMES

CROSS REFERENCE TO RELATED APPLICATIONS

This application is a continuation-in-part of Kasevich U.S.S.N. 491,005, filed Mar. 9, 1990, hereby incorporated by reference.

BACKGROUND OF THE INVENTION

The present invention relates to electromagnetic methods and apparatus for the treatment of radioactive material-containing volumes and in particular to methods and apparatus for the treatment of radioactive and mixed waste materials for more effective hazardous waste management.

Waste management problems have been exacerbated in the second half of this century by the quantity and toxicity of the waste material generated. Waste quantities have steadily increased due to the population growth and the rapid waste generation rates. In addition, as a result of relatively recent technological innovations, waste materials have become increasingly more toxic. A partial list of hazardous materials which now pose serious environmental and human health hazards include industrial wastes from solvent uses, electrochemical applications, fertilizers, and pesticides, as well as various highly-toxic chlorinated species (for example, polychlorinated dibenzo-p-dioxins, dibenzofurane and biphenyls), and radioactive wastes, many of which were not known in the first half of this century. Soils contaminated with creosote and pentachlorophenol from the operation of wood-treating plants are also a significant environmental hazard. Better technologies are urgently needed to detoxify and isolate these and other hazardous materials from the environment.

The disposal of hazardous materials in near-surface and subsurface formations has become more expensive and difficult as available land and high-quality groundwater resources have diminished. Historical practices, either deliberate or accidental, have left numerous site legacies that must be managed. Although much concern has focussed on species migration and groundwater contaminants, more effective remediation and control may result from soil management and on-site treatment practices. In some instances, modified site operations, as well as chemical and biological treatment technologies have useful roles in waste management. For many contaminated soils, high-temperature incineration is perhaps the most obvious treatment. While appropriate for some liquid wastes, other alternatives should be considered for soil remediation. Low temperature technologies, either chemical or biological treatment, for example, can achieve similar results at somewhat slower rates.

Hazardous radioactive waste materials continue to be an important problem area for the 1990's. These nuclear wastes define a wide range of products generated by a wide range of industrial processes. The waste can result from processes used by hospitals, universities, research institutions, electrical power industry facilities, the Department of Energy, and the Department of Defense. These wastes are not necessarily "esoteric", but comprise such materials as expended ventilation filters, redundant and damaged mechanical equipment such as pumps and valves, contaminated and redundant control equipment, contaminated glassware and containers, protective clothing, ion exchange resins, and sludges.

Attempts to store and dispose of these materials in shallow landfills have, in many cases, resulted in the leakage of radioactive leachates into soils and surface sediments. These primary and secondary wastes do not differ significantly in their physical form from much of the familiar commercial, industrial wastes. They become of special interest only because of their contamination with radioactive nuclides. Radio nuclides themselves cannot be rendered a non-radioactive by any treatment, and can only be made harmless to the environment by stabilization and storage to ensure complete isolation from the biosphere. The duration required to render the radioactive materials safe is dependent on the half-life of decay, and is a function of the toxicity of the radioisotope contaminating the waste. Much of the waste produced from medical diagnostic use and research is contaminated with radioisotopes with short half-lives so that the required decay/storage period is short. Others however, including much of the waste arising from the electrical utility industry and the Department of Defense, are contaminated with radioisotopes of long half-lives and high toxicity and require storage or isolation for very extended periods before they can be considered safe for release to the biosphere.

Stabilization, to prevent mobilization, is a key component to the management of radioactive contaminated waste. Factors to be considered in stabilization include transmutation of chemical compounds containing radioisotopes into forms which are physically more mobile or forms which are more biologically available. An example of this is waste contaminated with tritium, a radioactive form of hydrogen with a half-life of approximately 12.3 years. This isotope is widely used as a marker in organic liquid form for medical, diagnostic purposes and biotechnology research. It is a common contaminant of wastes arising from these industries. During storage of these wastes, it is common to find that biological decay processes within the waste can generate radioactive methane, which is not only an explosion hazard, but is also much more mobile in the environment than the original tritium compounds. Similarly, the conversion through biological decay processes of waste contaminated with radioactive isotopes of lead has resulted in the generation of biologically more mobile organolead compounds from wastes originally contaminated with isotopes, only in less biologically available elemental form.

The problems of immobilization are compounded with wastes significantly contaminated, or mixed, with chemicals. First, a wide range of physical and chemical processes can occur which enhance the rates of migration through natural lithology. This includes physical processes, such as increased dissolution rates and decreased precipitation, coprecipitation, or adsorption processes within the natural lithology of the host site. It can also include the formation of compounds of high mobility through chelation processes. This can disrupt the natural stabilization of organic compounds and may act synergistically in conjunction with the radioisotope to increase the risk of exposed organisms, including humans.

These so-called mixed wastes, are subject to substantial regulation under both the Conservation and Recovery Act and the Atomic Energy Act. The practices used to eliminate hazards relating to mixed wastes include either a restriction in the half-lives of the radioactive materials that can be stored or treatment to eliminate the chemical hazards. Many mixed wastes, either because of the long half-lives of some of the radioactive components, or because the chemical wastes are intractable to treatment, cannot conform to this policy. Such wastes are not being identified, or are being stored at the source.

It is therefore an object of this invention to treat radioactive material-containing volumes to manage the waste materials, and, in the case of mixed waste, to separate the radioactive materials from the non-radioactive materials, thus helping to stabilize the waste. A further object of the invention is a method and apparatus for safely containing and controlling the mixed waste materials during the treatment process.

SUMMARY OF THE INVENTION

This invention relates to a method and apparatus for using an electromagnetic apparatus to treat hazardous radioactive material-containing volumes. In one embodiment, the apparatus is used to volumetrically heat, and thereby volatilize the organics combined with the hazardous radioactive materials. The volatilized materials can then be collected in, for example, vapor form and transported to a storage facility by a flow conduit.

A phase-modulated multiple antenna system treats larger hazardous waste sites through the constructive and destructive interference of radio waves to produce the desired heating pattern. According to this embodiment of the invention, the current to each individual antenna apparatus can be appropriately phased relative to each other and as a function of time, to provide steerable and variable heating patterns.

The apparatus relates to treating radioactive containing materials which have been placed in a storage drum or container. The apparatus features an enclosed treatment chamber, elements for placing the storage container in the enclosed treatment chamber, a radiating antenna for providing electromagnetic energy in the storage container, the antenna being in the chamber and if desired also inserted into the container for volatilizing components of the stored materials. The apparatus further features conduit or other elements for transporting the volatilized materials to a disposal facility.

In a preferred embodiment of the invention, the chamber has a viewing opening for examining the interior of the chamber during radiation heating of the container, a mechanical mechanism for removing and refitting a lid of the container while it is in the chamber, and sensing elements for determining and measuring temperature and pressure within the chamber. Preferably, the frequency of radiation is selected at one or more of the resonant frequencies of the chamber/container configuration.

These and other aspects, objects and advantages of the present invention will become apparent from the following detailed description, particularly when taken in conjunction with the accompanying drawings.

DETAILED DESCRIPTION OF PREFERRED EMBODIMENTS OF THE INVENTION

The present invention relates to electromagnetic methods for the treatment of radioactive material-containing volumes such as storage containers, as well as the in situ treatment of radioactive waste burial grounds. The electromagnetic heating is provided by one or more radio frequency antennae which have the capability of efficiently heating the mixed waste either in containers or in situ. The term mixed waste shall include any man-made or naturally-occurring organic or inorganic non-radioactive substances, typically in solid or liquid form, mixed with radioactive waste materials.

In particular embodiments of the invention, the radio frequency antenna employed is based on the collinear array disclosed in Kasevich et al, U.S. Pat. No. 4,700,716, which is incorporated herein, in its entirety, by reference. However, when heating a closed container, other antennae well known in the field such as a loop antenna, can be used as described herein.

Figure 1:
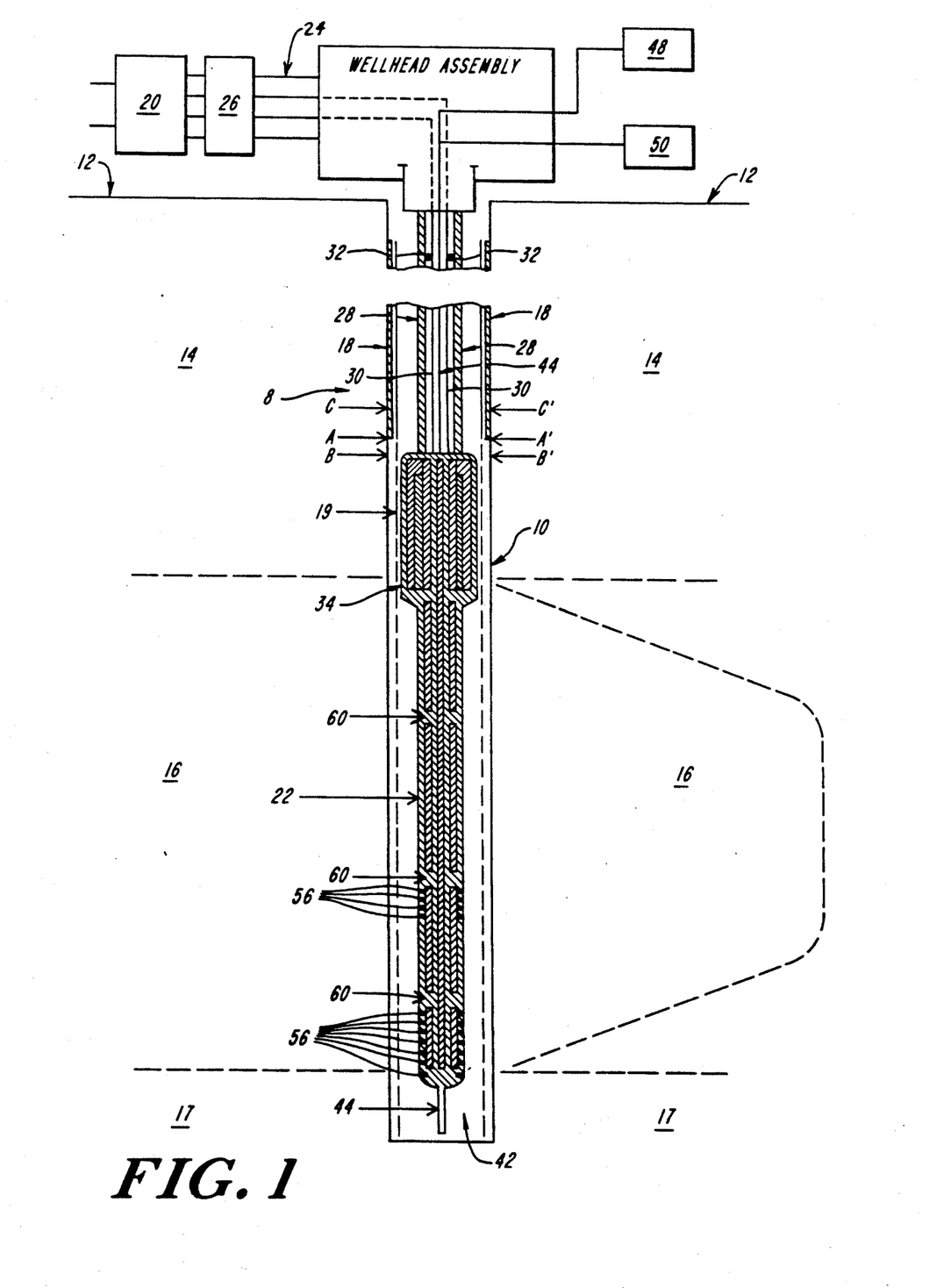
FIG. 1 is a vertical schematic sectional view of the antenna apparatus of the present invention.
Figure 2:
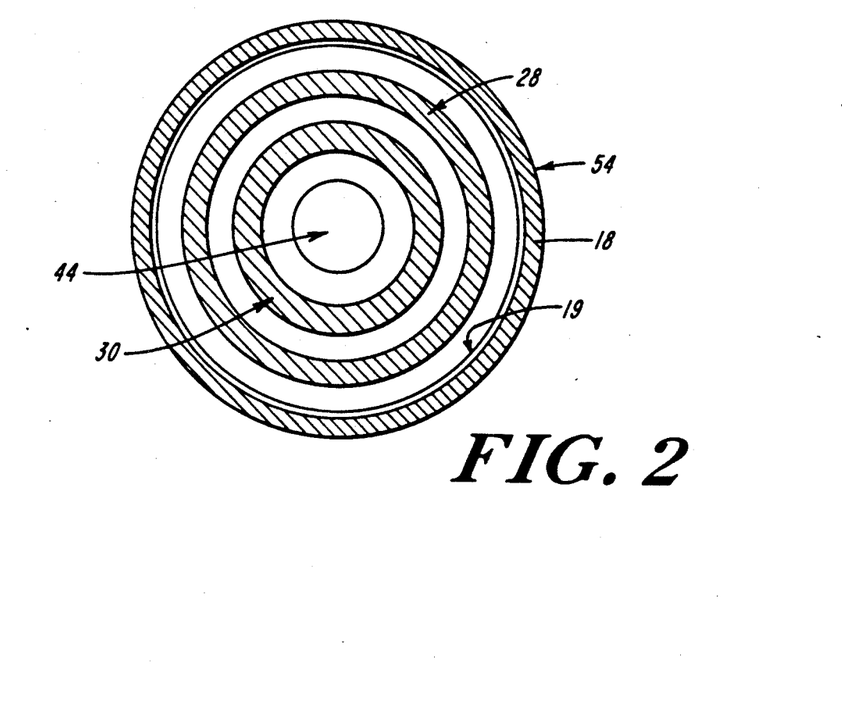
FIG. 2 is a cross-sectional view of the antenna apparatus of FIG. 1 taken along line C—C'.
Figure 3:
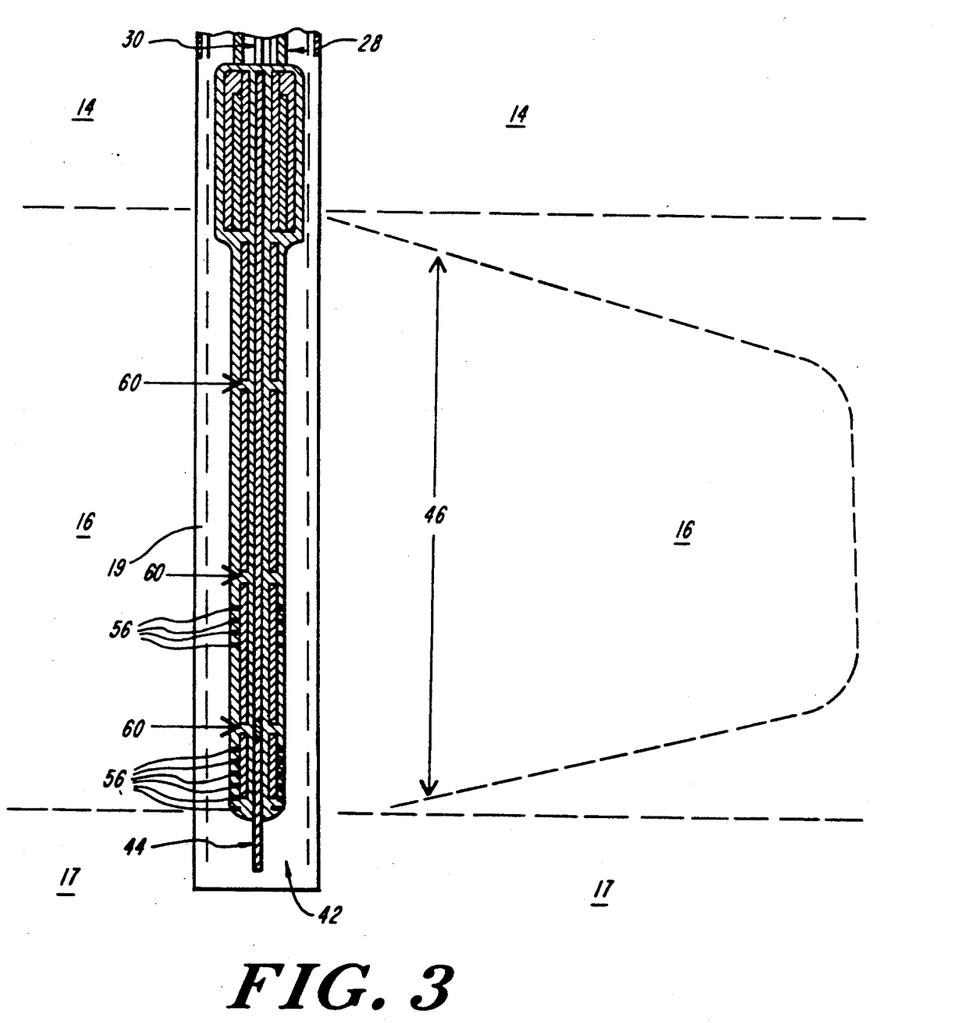
FIG. 3 is an enlarged view of the collinear antenna shown in FIG. 1.

Referring to FIGS. 1-3, an antenna apparatus 8, for use in accordance with one preferred embodiment of the invention, is an unbound system designed for generating near-uniform heating of hazardous radioactive material-containing volumes by radiating energy into the subsurface formation. This antenna apparatus, as will be discussed below, maximizes the coupling of energy into the specific volume of waste material being heated (for example, in soil matrices and near groundwater/soil interfaces).

In one embodiment, a borehole 10 is drilled into a region of the earth to extend from the earth's surface 12 through a layer 14 and into the region of the earth in which hazardous materials are located (the "contaminated region" 16). The contaminated region 16 overlies a layer 17. The borehole 10 is cased with a casing 18 in a conventional manner over its length through layer 14. Preferably, casing 18 is comprised of lengths of fiberglass casing or steel casing (for example, oil field casing) joined together and cemented in place in borehole 10. A radio frequency transparent liner 19 extends from the wellhead along the inner surface of casing 18 and through contaminated region 16 and into layer 17 to the bottom of borehole 10. Alternatively, radio frequency transparent liner 19 may be disposed in borehole 10 in vertical relation to casing 18, and joined thereto at position A—A'. The radio frequency transparent liner 19 is preferably made of a flexible non-conductive substance such as plastic, fiberglass, polyvinyl chloride (PVC) or a similar substance which can withstand a relatively moderate temperature environment (that is, approximately 100° C.). The section of liner 19 which is positioned adjacent to contaminated region 16 can have, and in the illustrated embodiment does have, mechanical perforations to allow liquid and/or gaseous materials to enter borehole 10.

A high power RF generator 20 transmits electromagnetic energy to a downhole radio frequency antenna over either a flexible or semi-rigid coaxial transmission line 24. The radio frequency antenna 22 is shown in the form of a collinear antenna array having, in the illustrated embodiment, three antennae fabricated from a coaxial transmission line comprising an inner conductor and an outer coaxial conductor with an impedance matching element (see below). However, it should be noted that other RF antenna designs can be used. The RF generator 20, which may be located on the earth's surface or in the borehole, is coupled to coaxial transmission line 24 by a coaxial liquid dielectric impedance matching transformer 26. The outer conductor 28 of coaxial transmission line 24 is a hollow tubular member, and the inner conductor 30 is a hollow tubular member of smaller diameter which is continuous through collinear array antenna 22. Outer conductor 28 of coaxial transmission line 24 and inner conductor 30 are spaced and insulated from one another by insulating spacers 32 (for example, ceramic discs). Multiple sections of coaxial transmission line 24 are coupled together in borehole 10 to form a string having sufficient length to reach contaminated region 16.

The collinear array antenna 22 is disposed in borehole 10 in coaxial relation to outer conductor 28 and coupled thereto at B—B' through a bifurcated transformer and choke assembly 34. The collinear array antenna 22, which is based on the collinear antenna array disclosed in Kasevich et al, U.S. Pat. No. 4,700,716, can operate at a selected frequency in the range of between 100 kilohertz (KHz) and about 2.45 gigahertz (GHz). In most cases, the volume and dielectric properties of a soil, or other subsurface formation, will determine the optimal frequency for the most effective heating results.

The antenna 22 is coupled to the distal terminus of the string, as noted above, and extends into a material collection region (for example, sump 42) of borehole 10 such that radio frequency antenna 22 may or may not be partially submerged in any liquid material collecting in the bottom of borehole 10. A fluid flow line 44, positioned inside inner conductor pipe 30, extends from a distal section 46 of radio frequency antenna 22 through coaxial transmission line 24 to a storage container 48. Alternatively, flow line 44 may project through an opening in the final quarter-wavelength section of collinear antenna 22 and into fluid material which collects in sump 42. (A separate flow line can also be used.) The flow line is preferably made from plastic, PVC or a similar electrically non-conductive substance. The heated fluid material (gaseous or liquid) is lifted from sump 42 to storage facility 48 by an above-ground lifting element 50 (for example, a rocker or Moyno type pump for liquids). Alternatively, the lifting element may be positioned in sump 42 or in the final quarter-wavelength section of collinear array antenna 22. A high pressure hose 52 from above-ground lifting element 50 can be positioned between the outer surface of casing 18 and a borehole wall 54 to create a pressure gradient which will assist in the transport of materials through the flow line 44.

Referring to FIG. 3, collinear antenna array 22 is a coaxial structure that provides a uniform distribution of radiated power along its length without leakage of power to the connecting coaxial transmission line. In accordance with one embodiment of the invention, the apertures 56 in the distal section 46 assist in the collection of materials by providing a path for the flow of heated liquid or gaseous materials from the contaminated region into the distal section 46 of antenna 22. The apertures 56 may be of any desired size and spacing, depending on the rate of production of fluid material from the contaminated region and on the size of fractured pieces of the subsurface formation which cannot be allowed to pass into antenna 22.

As described in Kasevich et al, U.S. Pat. No. 4,700,716, collinear array antenna 22 is formed by providing circumferential gaps 60 in the outer conductor 62 to expose the dielectric core 64 of the transmission line structure. Preferably, the widths of gaps 60 are about the same size as the distance between center conductor 66 and outer conductor 62. Core 64 may comprise a suitable solid dielectric insulator, such as aluminum oxide or teflon. Gaps 60 provide excitation feeds for more remote, for example, more distal end, antenna sections and result in the equivalent of more than one antenna pattern being generated from the length of the center conductor. The electrical lengths of these antenna sections are harmonically related to each other.

In accordance with the theoretical and experimental teaching of Altschuler ("The Traveling-Wave Linear Antenna," E. E. Altschuler, Cruft Laboratory, Harvard University, Cambridge, Mass., *Scientific Report No. 7*, May 5, 1960), an essentially traveling-wave distribution of current can be produced on a linear antenna by inserting a resistance of suitable magnitude one-quarter wavelength from the end of the antenna. The effect of such resistance is to significantly change the radiation pattern of the antenna and therefore, in the present application, its heating pattern for the hazardous material-containing volume. The collinear array antenna 22 of the present invention is therefore provided with the appropriate value of resistance about one-quarter wavelength from the end of the distal section. By changing the applied frequency, or the location of the resistance, the distribution of heat around the antenna may therefore be changed or "steered" in planes passing through the antenna axis.

In operation, as the transmitted power from RF generator 20 is delivered through coaxial line 24 (formed by inner and outer conductors 28 and 30), each antenna section is excited and electromagnetic energy is radiated from the antenna and is absorbed by the contaminated region.

Figure 4:
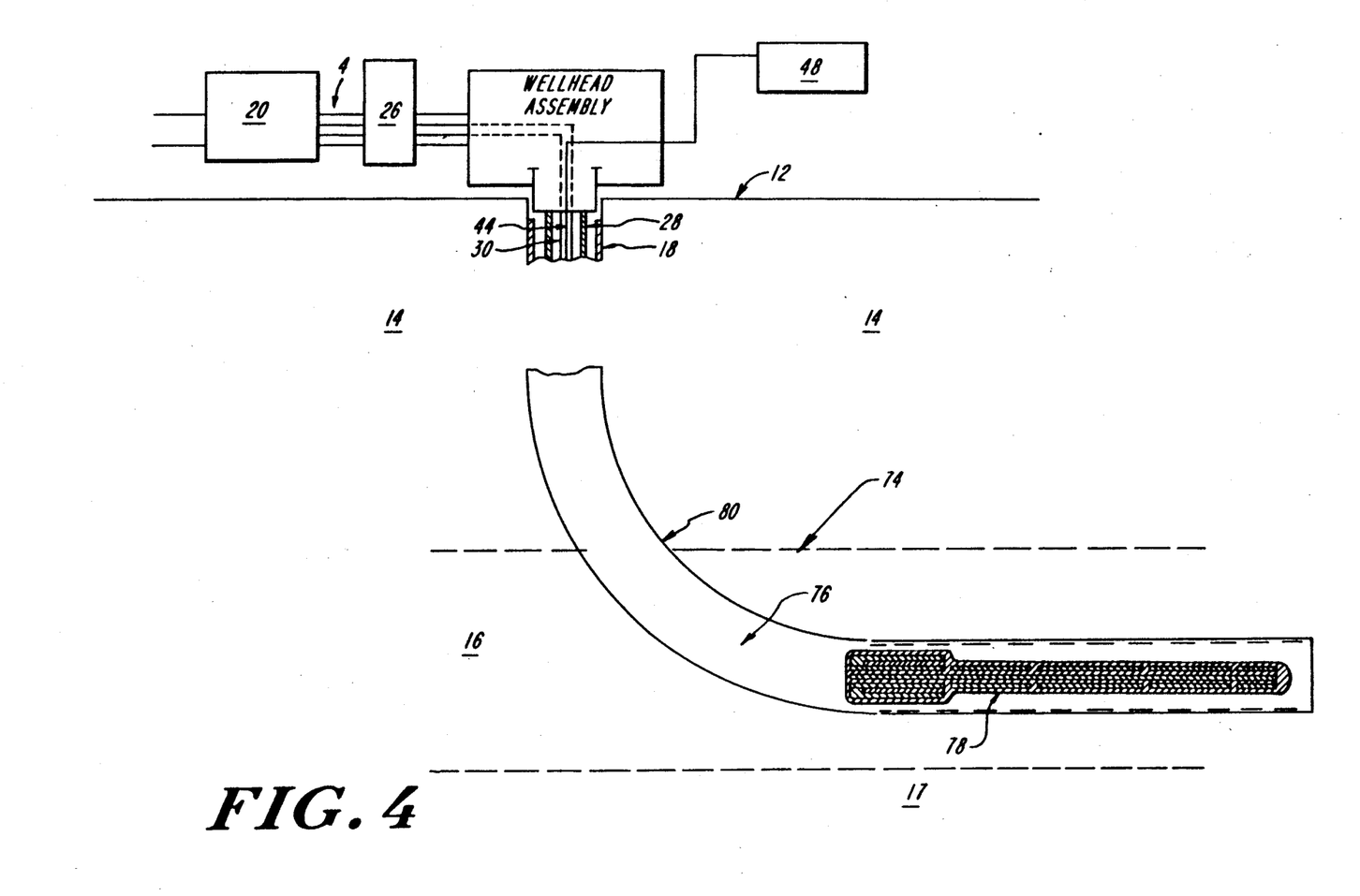
FIG. 4 is a vertical schematic sectional view of a flexible antenna apparatus inserted into a substantially horizontal borehole.

Referring to FIG. 4, a flexible or semi-rigid antenna apparatus 74 can be inserted into a substantially horizontal borehole 76 for heating and recovering hazardous materials from contaminated region 16. Flexible antenna apparatus 74 is designed for use in a horizontal borehole 76 to provide a more economical treatment of radioactive waste materials since fewer drilled holes are required when horizontal boreholes are used. The flexible antenna apparatus can be directed, via a horizontal borehole, underneath an existing structure for the removal of toxic materials without disturbing the structure.

The flexible antenna apparatus 74 may consist of a flexible or semi-rigid collinear antenna array 78 or a flexible or semi-rigid coaxial transmission line 80 or both. Flexible coaxial transmission line 80 and flexible collinear antenna 78 can be constructed from a composite of any of a number of different materials, including fiberglass, ceramics, teflon, plastics, metal laminates, composite materials of insulators and conductors, epoxy, fiber, clay-filled phenolics, and reinforced epoxy. Alternatively, the flexible coaxial transmission line and/or flexible collinear array antenna may be fabricated with flexible mechanical joints.

Figure 5:
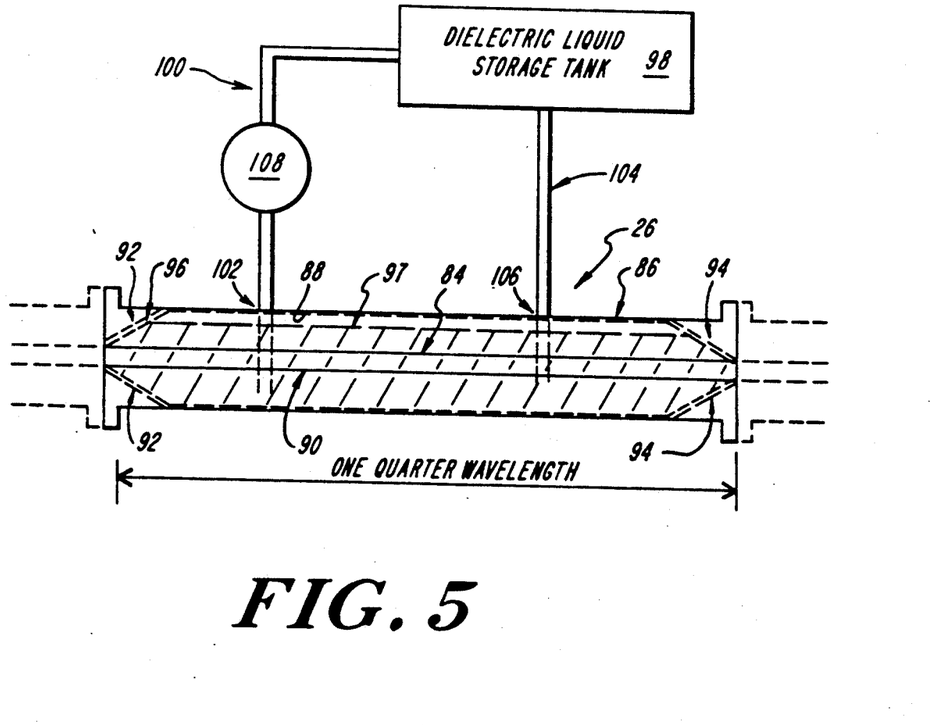
FIG. 5 is an enlarged cross-sectional view of the coaxial liquid dielectric impedance transformer shown in FIG. 1.

As a means of establishing efficient impedance matching between RF generator 20 and radio frequency antenna 22, which may be immersed in liquid material in sump 42, a coaxial liquid-dielectric impedance transformer 26 is provided (See FIG. 1). Referring to FIG. 5, coaxial transformer 26 can be essentially a horizontally or vertically disposed liquid-containing (for example, silicone oil) vessel having an inner conductor 84 and an outer conductor 86 to provide a specified characteristic impedance. (Preferably, the size of the diameter of inner conductor 84 is adjustable.) The inner surface 88 of outer conductor 86 and the outer surface 90 of inner conductor 84 are lined with a non-conductive substance (for example, plastic or PVC) which is sealed at proximal flanges 92 and distal flanges 94 to form a dielectric liquid vessel 96. The length of the vessel 96 is one-quarter wavelength. The dielectric liquid level 97 in a vessel 96 controls the electrical length of the transformer and, therefore, its ability to transform (that is, match) the coaxial line impedance to the antenna impedance. Therefore, the dynamic impedance match between RF generator 20 and the downhole antenna can be adjusted to insure maximum power flow to the antenna and to insure a satisfactory impedance measurement, as represented by the Voltage Standing Wave Ratio (VSWR).

In order to adjust the liquid level within transformer 26, a dielectric liquid reservoir 98 is provided in liquid communication with transformer 26 through a flow line 100 coupled to an inlet 102 and a flow line 104 coupled to an outlet 106. A pump 108 is provided as a means for transporting dielectric liquid between a dielectric liquid reservoir 98 and coaxial transformer 26.

Method of Operation

In one mode of operation, referring to FIGS. 1-3, the high power RF generator 20, which operates in either a continuous wave (cw) or a pulsed mode, supplies electromagnetic energy over the coaxial transmission line 24 to downhole radio frequency antenna 22. The dielectric heating produced by the RF antenna extends radially away from the antenna and into contaminated region 16.

The radial extent of the heating pattern from a single borehole apparatus will vary as a function of the operating frequency, the length of the RF antenna, and the electrical conductivity and dielectric constant of the lossy media (contaminated region 16). For example, other parameters being constant, applying energy at a frequency of 1 megahertz (MHz) will provide approximately a 100 foot diameter heating zone for the enhanced recovery of hazardous materials. In comparison, applying energy at a frequency of 27 MHz will provide approximately a 24 foot diameter heating zone.

Water converted to steam in the contaminated region by RF energy will significantly enhance the extent of heat penetration from the borehole because of the attendant reduction in the material dielectric losses where steam is produced. Steam does not absorb RF energy while water does. When the system produces steam, the diameter of the heating zone will typically expand to where the steam is not present and water begins. This expansion could be significant (for example, from the original 24 foot heating diameter to a 100 foot heating diameter at 27 MHz; and from the 100 foot heating diameter at 1 MHz to a several hundred foot heating diameter).

As region 16 heats from the absorption of RF energy, any flowable solid materials will become less viscous or liquefied or gasified and begin to flow toward borehole 10 if the borehole is kept at a low pressure (for example, pumped). The apertures (or perforations) 56 in the distal section 46 of antenna 22 act as portals to collect the heated fluid flow. The heated fluid can be transported by flow line 44 to storage facility 48. As shown in FIG. 1, the flow line 44 extends from storage facility 48 through the center conductor 28 of coaxial transmission line 24 and the center conductor of collinear antenna 22, through an opening in the distal section 46 of antenna 22, and into sump 42.

Depending on the particular design of the apparatus employed, the flow either will collect in sump 42 at the bottom of borehole 10 before being transported to storage facility 48, or will be immediately transported to storage facility 48 as it enters distal section 46 of antenna 22. A mechanical pump (or other pressure source) is located either on the earth's surface, in the final quarter-wavelength section of antenna 22, or in sump 42.

For certain mixed waste hazardous material(s), the RF energy is employed to increase the temperature of the organic materials and thereby volatilize those organic materials. The resultant vapor by-products are transported from the mixed waste material-containing volume to a storage facility via the production flow line of the antenna apparatus. Alternatively, the hazardous vapor products can be removed by the use of a vacuum means. Accordingly, this invention describes a method of efficiently extracting the vapors of contaminants which are not naturally volatile at ambient temperatures. Compounds that can be effectively extracted using this method include gasoline, diesel fuel, hexane, benzene, toluene, ethyl benzene, carbon tetrachloride, chloroform, acetone and methanol.

Phase-Modulated Multiple Apparatus System

In yet another embodiment of the invention, a multiple apparatus phased array system heats and recovers organic materials from larger mixed waste land regions by employing a multiple antenna apparatus system. To treat very large areas in a cost-effective manner, a multiple apparatus system will typically consist of at least two, and preferably three or more, individual antenna apparati inserted in boreholes arranged in a geometric pattern. A multiple apparatus system may consist of flexible or semi-rigid antenna apparati inserted in either substantially vertical boreholes, substantially horizontal boreholes or a combination of substantially vertical boreholes and substantially horizontal boreholes.

Figure 6:
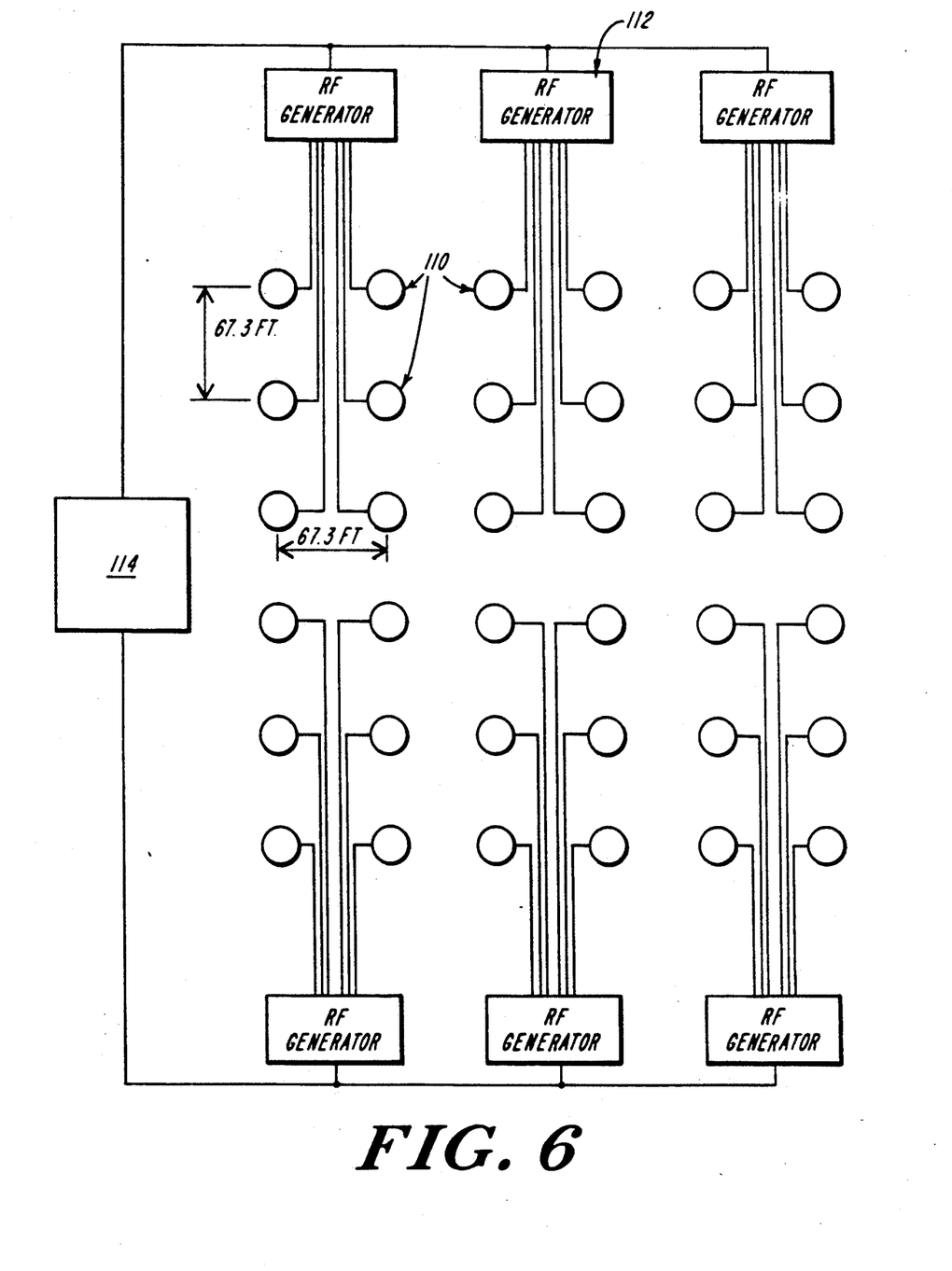
FIG. 6 is a schematic representation of a top view of a multiple antenna system.

Referring to FIG. 6, a multiple apparatus system is shown for use in a hypothetical situation in which the contaminated region is 20 feet thick and occupies a square shaped area of approximately three acres. At a radio frequency of approximately 14 MHz, this system consists of thirty-six antenna apparati 110 (described in FIG. 1) disposed in boreholes drilled in a square grid pattern, the grids being approximately sixty-seven feet apart. Each illustrated antenna apparatus is approximately four to eight inches in diameter. The vertical borehole depth may be up to several hundred feet or more to the bottom of the contaminated region. All antennas are powered by RF generators 112 (for example, approximately 25 kilowatts of power per borehole) that may be operated in either a cw or pulsed mode. Both the borehole temperature and feed-line VSWR are monitored in real time. This information is supplied to and used by a central computer 114 for power and phase control adjustment (throughout the heating period) to insure maximum production rates with time.

Figure 7:
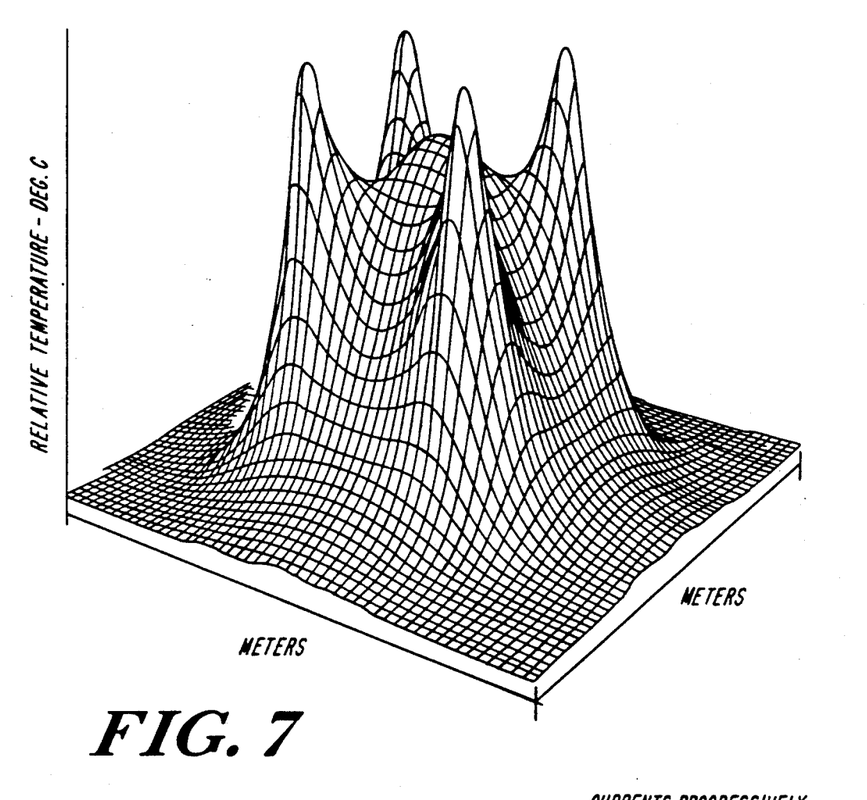
FIG. 7 is a graphical representation demonstrating the near-uniform heating generated in a multiple apparatus system.

The phased array system is capable of providing a near-uniform disposition of electromagnetic power in the contaminated region by proper antenna design, borehole spacing and choice of frequency and phase modulation. Referring to FIG. 7, the three-dimensional temperature distribution profile represents the temperature uniformity generated by a four apparatus system (the boreholes being at the corners of a square) when all four input currents to the antennas are in time phase. In this example, the energy from one apparatus, at the selected frequency, will arrive at a second apparatus out of phase and will cancel a portion of the radiating field gradient. Thus, the heating effect in the areas immediately adjacent the respective apparati will be reduced while the radiating fields will have an additive effect in the central areas of the contaminated region. Thus, when multiple apparati are properly spaced with different current phasings, that may vary in time, a volumetric heating pattern is generated that produces an essentially uniform average temperature distribution throughout the contaminated region.

In operation, the volume near each borehole will initially absorb most of the radiated energy, and hence be higher in temperature than areas distant from the borehole; but this difference in temperature is reduced by using pulsed or reduced cw power into each antenna for a short period of time while still heating the contaminated region further away (for example, using natural heat conduction in the formation to even out the temperature distribution). Eventually, a steady-state condition will exist whereby heating is relatively uniform throughout the contaminated region. The heat distribution and focusing may be continuously altered by the computer to maintain even temperatures by phase modulation.

Figure 8A:
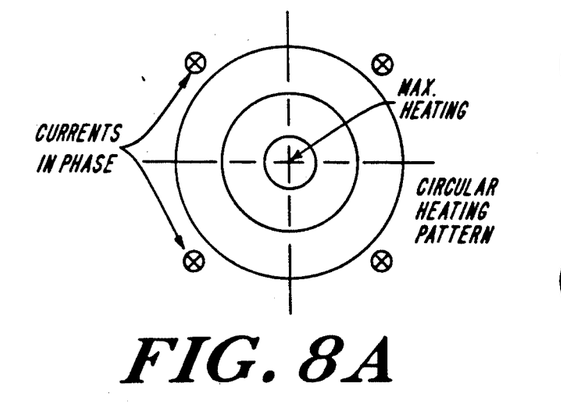
FIGS. 8(a) and 8(b) are schematic representations of the temperature profiles generated by two different current phasings in a phase-modulated multiple antenna system.
Figure 8B:
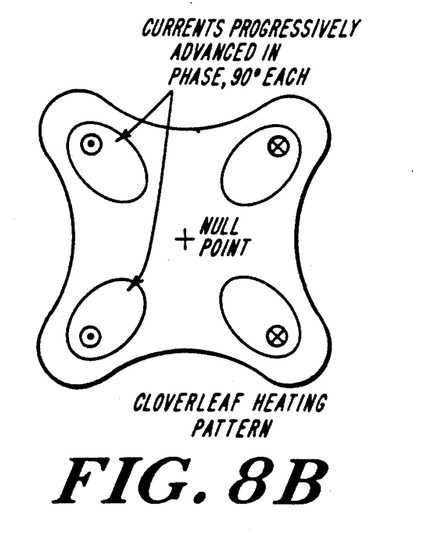

In the multiple apparatus system disclosed herein, the phasing of currents may be varied on each antenna either sequentially or simultaneously (in time) to permit great latitude in the control of heating pattern dynamics and to insure temperature uniformity and temperature control near and away from the boreholes. Referring to FIG. 8, temperature profiles for two different phase conditions provide two different heating patterns. An example of a four borehole system with all currents in phase is shown in FIG. 8(a). An example of the same system with the relative current phases, working clockwise, being 0°, 90°, 180°, 270° is shown in FIG. 8(b). As illustrated, when all currents are in phase (FIG. 8(a)) a near-uniform heating pattern is generated in the equatorial plane; and a 90 degree progressive phase pattern (FIG. 8(b)) provides a null in the equatorial plane at the center of the array. A combination of these phasings, as well as intermediate values, will provide a steerable heating pattern to compensate for heat loss by conduction and to avoid hot spots in the pattern.

Still referring to FIG. 6, the RF power transmitted to each apparatus of the multiple apparatus system is controlled by the central computer 114. Each RF generator is in electrical communication with central computer 114. In addition, the central computer will receive information from each antenna apparatus 110 regarding the rate of waste extraction, the VSWR, and the temperature of the contaminated region, so that individual adjustments in power cycling, current phasing and power level can be made.

The number of RF generators employed in a multiple apparatus system depends on the production rate desired. For example, a single 25 KW generator may be used to heat several boreholes sequentially in time. Twenty-five kilowatts of power will be applied to borehole 1 for a period of time sufficient to initiate extraction of organic materials. Borehole 1 will continue to extract materials as the RF generator is switched to borehole 2. Once production begins from borehole 2, the RF generator will be switched to borehole 3 and at boreholes 1 and 2 pumping will begin or continue. The residual heat near boreholes in 1 and 2 will be sufficient for some period of time to maintain production. As the production rate in borehole 1 diminishes, the generator will be electrically switched back to borehole 1 to maintain its production. By employing this matrix approach, the number of generators required is reduced.

The Removal of Organic or Inorganic Materials From Mixed Waste Containing Storage Tanks In another embodiment of the invention, electromagnetic energy can be used to assist in the removal of organic or inorganic materials from mixed waste containing containers and drums.

Figure 9:
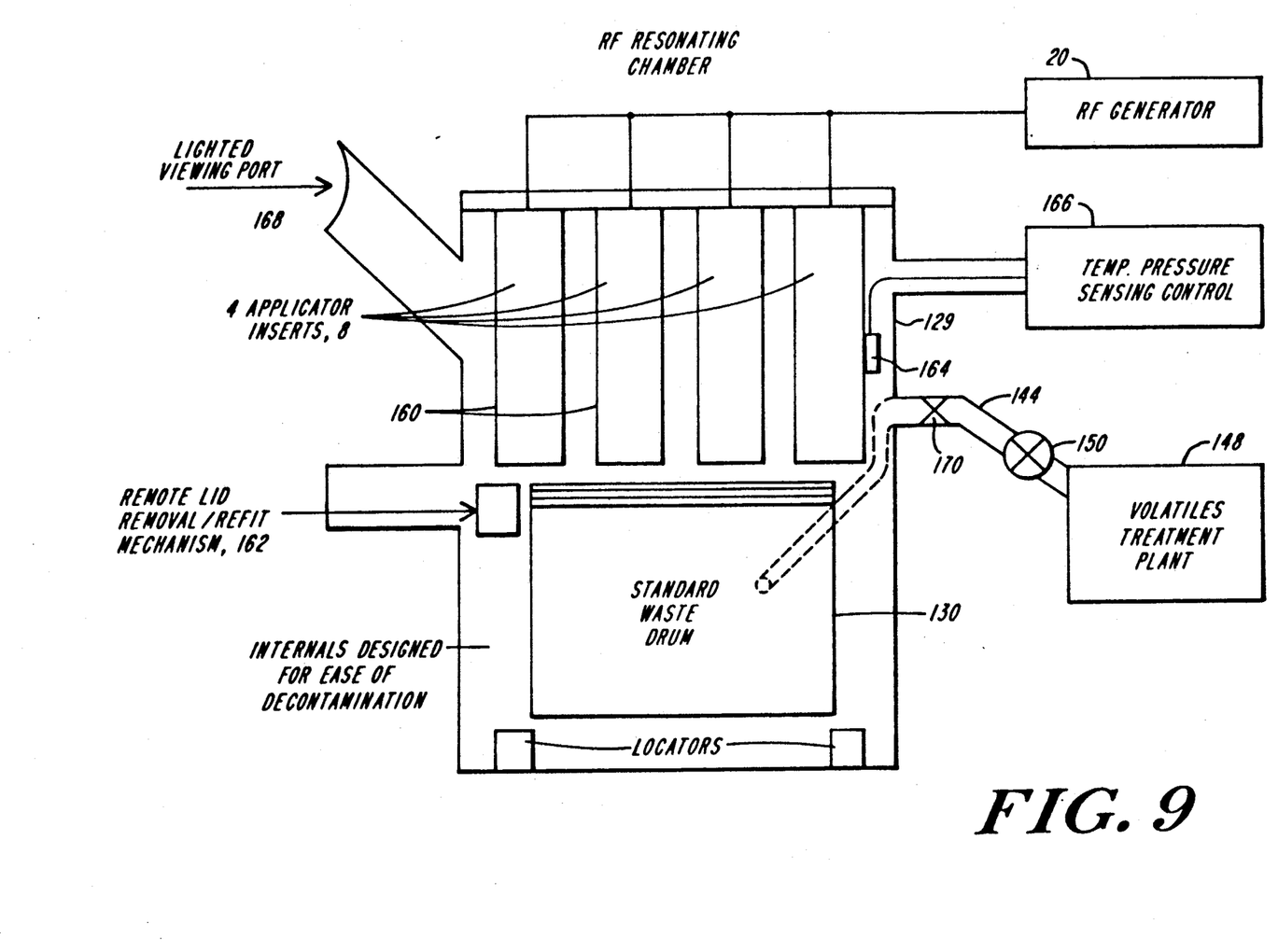
FIG. 9 is a vertical schematic sectional view of an antenna apparatus inserted into a storage tank containing a container or drum filled with radioactive mixed waste materials.

Referring to FIG. 9, a radio frequency antenna apparatus 8, such as the collinear array antenna described herein, is inserted into a treatment chamber 129 containing a storage container or drum 130, and then is energized using a radio frequency generator 20 positioned outside the chamber 129. Alternatively, the radio frequency generator may be positioned within the antenna apparatus.

The heat generated by the antenna's RF radiation raises the temperature of the mixed waste. As a result, any flowable solid materials will become less viscous, liquefied or preferably volatilized. The heated gaseous flow, typically of non-hazardous organics, can be transported by a flow line 144 to a storage and treatment facility 148. A mechanical pump, such as pump 150, or other pressure (or vacuum) source, is located, preferably, outside the chamber. As shown in FIG. 9, the flow line 144 may extend through an opening in the drum, and into the hazardous mixed waste material. The fluid material is then collected and extracted in the manner described above.

Referring still to FIG. 9, the chamber is designed as an "RF-resonance" chamber and is equipped with RF transparent sleeves 160 for the introduction of RF energy with zero risk of the release of radioactive materials. The chamber incorporates an installed remote lid removal and lid refitting mechanism 162, temperature and pressure measuring probes 164 and their control and measurement circuitry 166, and a lighting facility and a viewing facility 168 in accordance with the illustrated embodiment of the invention. The internal surface of the container is designed for ease of decontamination. Valved extraction conduits to condenser traps 170 provide for the safe removal and collection of volatilize.

The resonant chamber heating system differs from the previously described subsurface radiation system in terms of applicator design and operating parameters. The RF heating applicator for the chamber is designed to resonate the entire volume of the metallic drum (that contains the material to be heated) and chamber. This design of RF heating system can be highly efficient, and very compact, in its physical design. In accordance with a second particular embodiment for treating newly generated mixed wastes, simple, RF transparent ports are built into the storage drum to be serviced through an installed support facility (such as chamber 129), for the collection and packaging of the separated component. In accordance with either design, the RF signal can introduce energy directly into the waste, raising the temperature of any organic component in a carefully controlled manner. The ability to control temperature rise accurately within the waste is of fundamental importance in the control of risk to the operators during waste treatment.

The illustrated embodiment of the invention also allows sterilization of the mixed waste to any presently known government standard, and provides for the removal, preferably by volatilization, at any temperature, of volatile organics within the waste. For example, a mixed waste containing material contaminated with plutonium, enriched uranium, or a wide range of fission products, and also contaminated with organic cleaning or decontamination fluids, thereby designated a mixed waste, can be separated into a non-radioactive component through carefully controlled volatilization and collection of the cleaning and decontamination fluids in an external trap. This leaves the radioactive component within the existing storage drum. The radioactive component can also be sterilized prior to resealing of the drum for long-term storage. Importantly, the separation method does not generate any secondary wastes nor does it increase the volume or weight of the waste being treated.

In accordance with a preferred method of operation, subsequent introduction of pressurized, sodium silicate based grout, into the sterilized, treated, and drummed residue can be provided if additional shielding or load bearing capacity for the treated drum is required. In other cases, the radioactive component of mixed waste may be the minor volatile component leaving a non-radioactive residue. An example is waste from the production of tritium sources for medical, diagnostic, or research purposes. In this instance, the volatile component can be readily trapped cryogenically and chemically stabilized.

It is anticipated that in cases involving the release of uranium or actinides, in conjunction with solvents, there would be ready and efficient partitioning between metals and solvents. In most instances, it should be acceptable to discharge the solvents directly into the atmosphere. In those circumstances where the concentration of solvents is expected to be in excess of that permitted for direct discharge, or in the event of a risk of an unacceptable discharge of radioactive materials to the atmosphere, the adoption of conventional vapor extraction equipment used in conjunction with RF heating should be adequate.

Further, the removal of the non-radioactive material from the mixed wastes, should reduce the mobility and environmental risk from the radioactive residue remaining significantly and can result in a situation where further treatment is not required. Also, however, the removal of the organic component can leave a residue which can be treated more efficiently to immobilize the remaining inorganic radioactive components. For example, radio frequency heating to volatilize the leachate for discharge to the atmosphere from a disposal facility where the leachate is comprised primarily of tritium, would in most circumstances be acceptable and achieve a significant reduction in radiological risk.

The invention can further be used in situations where the risk due to high gamma dose rate is substantial. The method of the invention can be oriented and coupled to direct energy beneath structures containing the high gamma dose rates so volatilize can be vented laterally. With this orientation, there would be no direct exposure of the operating staff to the high gamma fields. In another application, structures having a large surface area can be handled using a plurality of vertical boreholes through the structure. The efficiency of the method will limit the number of boreholes required and the reduced number of boreholes may be sufficient to reduce the operator's total gamma dose to an acceptable level. In the event that the individual gamma shine is excessive, the design of the applicator can be modified to incorporate a shield plug as is well known in the field.

Additions, subtractions, deletions and other modifications of the described embodiments will be apparent to those practiced in the art and are within the scope of the following claims.

What is claimed is:

1. A method for the treatment of a radioactive material-containing volume, comprising the steps of:
   radiating electromagnetic energy into said volume by means of a radio frequency antenna apparatus;
   volatilizing one of radioactive and non-radioactive materials in said volume; and
   transporting said volatilized materials from said volume.

2. The method of claim 1 wherein said material-containing volume is one of a storage container, a landfill site, and a land-disposal site.

3. The method of claim 1 wherein said volatilizing step includes the steps of:
   maintaining said volume at elevated temperatures using said radiated electromagnetic energy for a period of time sufficient to convert non-radioactive materials into vapor products;
   collecting said vapor products in said volume; and
   transporting said vapor products from said volume for safe disposal thereof.

4. A method for the treatment of a large radioactive waste-containing volume comprising the steps of:
   radiating electromagnetic energy into said large volume by means of a plurality of antenna apparati arranged according to a selected grid pattern wherein the phase of the energy delivered to each said apparatus is varied relative to other apparati for effecting a selected heating of said volume;
   volatilizing one of radioactive and non-radioactive materials in said volume; and
   transporting volatilized materials from said volume through a flow conduct.

5. A method for the treating radioactive materials in a storage container comprising the steps of:
   radiating electromagnetic energy into said storage container by means of a radio frequency antenna apparatus disposed in or near said storage container; and transporting said recovered materials to a disposal facility through a flow conduit which extends from said storage container to said storage facility.

6. The method of claim 5 further comprising the steps of placing said storage container in a container system, and radiating said energy at a resonant frequency of said container system.

7. The method of claim 6 wherein said materials are a mixed waste and further comprising the step of volatilizing one of the radioactive and non-radioactive materials of said mixed waste.

8. A method for the treatment of a radioactive material-containing volume situated beneath a structure comprising the steps of:

radiating electromagnetic energy into said volume by means of a flexible radio frequency antenna apparatus disposed in a substantially horizontal borehole directed underneath said structure;

volatilizing at least organic materials in said volume; and transporting said volatilized materials to a storage facility.

9. An apparatus for the treatment of a radioactive material containing volume comprising:

means for radiating electromagnetic energy into said volume by means of a radio frequency antenna apparatus for volatilizing a component of said volume; and means for transporting said volatilized materials from said volume.

10. The apparatus of claim 1 wherein said radiating means includes:

means for maintaining said volume at elevated temperatures for a period of time sufficient to convert non-radioactive materials into vapor products;

means for collecting said vapor products in said volume; and means for safely disposing of said vapor products.

11. An apparatus for the treating radioactive containing materials in a storage container comprising:

an enclosed chamber;

means for placing said container in said enclosed chamber;

means for radiating electromagnetic energy into said storage container by means of a radio frequency antenna apparatus disposed one of said chamber and said container for volatilizing components of said materials; and means for transporting said volatilized materials to a disposal facility.

12. The apparatus of claim 11 further comprising means for adjusting the excitation frequency of power applied to the antenna apparatus to one or more of the resonant frequencies of the chamber when it contains the container.

13. The apparatus of claim 12 further wherein said chamber comprises means for viewing the interior of said chamber during thermal radiation of said container, means for removing and refitting a lid of said container within the chamber, and means for sensing temperatures and pressure within said chamber.

* * * * *